US008505629B2

(12) United States Patent
Benkley et al.

(10) Patent No.: US 8,505,629 B2
(45) Date of Patent: *Aug. 13, 2013

(54) FOAMED SPACER FLUIDS CONTAINING CEMENT KILN DUST AND METHODS OF USE

(75) Inventors: James Robert Benkley, Duncan, OK (US); Joseph V. Spencer, Pampa, TX (US); Zachary Robert Kranz, Pampa, TX (US); Christopher Jay Garrison, Panhandle, TX (US); D. Chad Brenneis, Marlow, OK (US); Craig W. Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,145

(22) Filed: Jun. 27, 2012

(65) Prior Publication Data
US 2012/0267107 A1    Oct. 25, 2012

Related U.S. Application Data

(63) Continuation-in-part of application No. 12/895,436, filed on Sep. 30, 2010, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669.

(51) Int. Cl.
*E21B 33/16* (2006.01)
*C09K 8/40* (2006.01)

(52) U.S. Cl.
USPC ........... 166/291; 166/292; 166/293; 507/202; 507/269; 507/928

(58) Field of Classification Search
None
See application file for complete search history.

(56) References Cited

U.S. PATENT DOCUMENTS

| 2,045,899 | A | 6/1936 | Davis |
|---|---|---|---|
| 2,094,316 | A | 9/1937 | Cross et al. |
| 2,193,775 | A | 3/1940 | Stratford |
| 2,193,807 | A | 3/1940 | Dieterich |
| 2,329,940 | A | 9/1943 | Ponzer |
| 2,772,739 | A | 12/1956 | Arie |
| 2,842,205 | A | 7/1958 | Allen et al. |
| 2,848,051 | A | 8/1958 | Willaims |
| 2,871,133 | A | 1/1959 | Palonen et al. |
| 2,880,096 | A | 3/1959 | Hurley |
| 2,945,769 | A | 7/1960 | Gama et al. |
| 3,066,031 | A | 11/1962 | Schifferle |
| 3,168,139 | A | 2/1965 | Kennedy et al. |
| 3,320,077 | A | 5/1967 | Prior |
| 3,407,193 | A | 10/1968 | McColl et al. |
| 3,411,580 | A | 11/1968 | Roberts et al. |
| 3,454,095 | A | 7/1969 | Messenger et al. |
| 3,499,491 | A | 3/1970 | Wyant et al. |
| 3,557,876 | A | 1/1971 | Tragesser |
| 3,574,816 | A | 4/1971 | Abbdellatif et al. |
| 3,748,159 | A | 7/1973 | George |
| 3,749,173 | A | 7/1973 | Hill et al. |
| 3,863,718 | A | 2/1975 | Bruist |
| 3,876,005 | A | 4/1975 | Fincher et al. |
| 3,887,009 | A | 6/1975 | Miller et al. |
| 3,887,385 | A | 6/1975 | Quist et al. |
| 3,959,007 | A | 5/1976 | Pitt |
| 4,018,617 | A | 4/1977 | Nicholson |
| 4,018,619 | A | 4/1977 | Webster et al. |
| 4,031,184 | A | 6/1977 | McCord |
| 4,036,301 | A | 7/1977 | Powers et al. |
| 4,101,332 | A | 7/1978 | Nicholson |
| 4,105,459 | A | 8/1978 | Mehta |
| 4,141,843 | A | 2/1979 | Watson |
| 4,176,720 | A | 12/1979 | Wilson |
| 4,268,316 | A | 5/1981 | Wills et al. |
| 4,274,881 | A | 6/1981 | Langton |
| 4,304,300 | A | 12/1981 | Watson |
| 4,341,562 | A | 7/1982 | Ahlbeck |

(Continued)

FOREIGN PATENT DOCUMENTS

| CA | 2064682 | 4/1992 |
|---|---|---|
| CA | 2336077 | 1/2000 |

(Continued)

OTHER PUBLICATIONS

Office Action from U.S. Appl. No. 13/560,406 dated Oct. 17, 2012.

(Continued)

*Primary Examiner* — George Suchfield
(74) *Attorney, Agent, or Firm* — Craig W. Roddy; Tumey L.L.P.

(57) ABSTRACT

Disclosed are spacer fluids comprising cement kiln dust ("CKD") and methods of use in subterranean formations. An embodiment discloses a method comprising: providing a foamed spacer fluid comprising CKD, a foaming agent, a gas, and water; and introducing the foamed spacer fluid into a well bore to displace at least a portion of a first fluid present in the well bore. Another embodiment discloses a method comprising: providing a foamed spacer fluid comprising a partially calcined kiln feed removed from a gas stream, a foaming agent, a gas, and water, wherein the partially calcined kiln feed comprises $SiO_2$, $Al_2O_3$, $Fe_2O_3$, CaO, MgO, $SO_3$, $Na_2O$, and $K_2O$; and introducing the foamed spacer fluid into a well bore to displace at least a portion of a first fluid present in the well bore.

35 Claims, No Drawings

(56) References Cited

U.S. PATENT DOCUMENTS

| | | |
|---|---|---|
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A | 3/1984 | Burdick et al. |
| 4,460,292 A | 7/1984 | Durham et al. |
| 4,470,463 A | 9/1984 | Holland |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,829,107 A | 5/1989 | Kindt |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,113,943 A | 5/1992 | Wilson et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,290,355 A | 3/1994 | Jakel et al. |
| 5,295,543 A | 3/1994 | Terry et al. |
| 5,305,831 A | 4/1994 | Nahm |
| 5,314,022 A | 5/1994 | Cowan et al. |
| 5,316,083 A | 5/1994 | Nahm et al. |
| 5,327,968 A | 7/1994 | Onan et al. |
| 5,337,824 A | 8/1994 | Cowan |
| 5,339,902 A | 8/1994 | Harris et al. |
| 5,346,548 A | 9/1994 | Mehta |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,417,759 A | 5/1995 | Huddleston |
| 5,423,379 A | 6/1995 | Hale et al. |
| 5,430,235 A | 7/1995 | Hooykaas et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,123 A | 6/1996 | Carpenter et al. |
| 5,529,624 A | 6/1996 | Riegler |
| 5,536,311 A | 7/1996 | Rodrigues |
| 5,542,782 A | 8/1996 | Carter et al. |
| 5,554,352 A | 9/1996 | Jaques et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,789,352 A | 8/1998 | Carpenter |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer |
| 6,451,104 B2 | 9/2002 | Mehta |
| 6,457,524 B1 | 10/2002 | Roddy |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 * | 12/2003 | Chatterji et al. ............... 166/291 |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |

| | | | |
|---|---|---|---|
| 6,716,282 B2 | 4/2004 | Griffith et al. | |
| 6,729,405 B2 | 5/2004 | DiLullo et al. | |
| 6,755,905 B2 | 6/2004 | Oates | |
| 6,767,398 B2 | 7/2004 | Trato | |
| 6,776,237 B2 | 8/2004 | Dao et al. | |
| 6,796,378 B2 | 9/2004 | Reddy et al. | |
| 6,797,054 B2 | 9/2004 | Chatterji et al. | |
| 6,823,940 B2 | 11/2004 | Reddy et al. | |
| 6,832,652 B1 | 12/2004 | Dillenbeck et al. | |
| 6,835,243 B2 | 12/2004 | Brothers et al. | |
| 6,837,316 B2 | 1/2005 | Reddy et al. | |
| 6,840,318 B2 | 1/2005 | Lee | |
| 6,846,357 B2 | 1/2005 | Reddy et al. | |
| 6,848,519 B2 | 2/2005 | Reddy et al. | |
| 6,874,578 B1 | 4/2005 | Garnier | |
| 6,883,609 B2 | 4/2005 | Drochon | |
| 6,887,833 B2 | 5/2005 | Brothers et al. | |
| 6,889,767 B2 | 5/2005 | Reddy et al. | |
| 6,904,971 B2 | 6/2005 | Brothers et al. | |
| 6,908,508 B2 | 6/2005 | Brothers | |
| 6,911,078 B2 | 6/2005 | Barlet-Gouedard et al. | |
| 7,022,755 B1 | 4/2006 | Chatterji et al. | |
| 7,048,053 B2 | 5/2006 | Santra et al. | |
| 7,077,203 B1 | 7/2006 | Roddy et al. | |
| 7,101,829 B2 | 9/2006 | Guichard | |
| 7,174,962 B1 | 2/2007 | Roddy et al. | |
| 7,182,137 B2 | 2/2007 | Fyten et al. | |
| 7,199,086 B1 | 4/2007 | Roddy et al. | |
| 7,204,307 B2 | 4/2007 | Roddy et al. | |
| 7,204,310 B1 | 4/2007 | Roddy et al. | |
| 7,213,646 B2 | 5/2007 | Roddy et al. | |
| 7,284,609 B2 | 10/2007 | Roddy et al. | |
| 7,285,164 B2 | 10/2007 | Luke et al. | |
| 7,285,166 B2 | 10/2007 | Luke et al. | |
| 7,293,609 B2 | 11/2007 | Dealy | |
| 7,335,252 B2 | 2/2008 | Roddy et al. | |
| 7,337,842 B2 | 3/2008 | Roddy et al. | |
| 7,338,923 B2 | 3/2008 | Roddy et al. | |
| 7,341,104 B2 | 3/2008 | Roddy et al. | |
| 7,350,573 B2 | 4/2008 | Reddy | |
| 7,353,870 B2 | 4/2008 | Roddy et al. | |
| 7,381,263 B2 | 6/2008 | Roddy et al. | |
| 7,387,675 B2 | 6/2008 | Roddy et al. | |
| 7,395,860 B2 | 7/2008 | Roddy et al. | |
| 7,404,855 B2 | 7/2008 | Chatterji et al. | |
| 7,409,990 B1 | 8/2008 | Burts et al. | |
| 7,445,669 B2 | 11/2008 | Roddy et al. | |
| 7,478,675 B2 | 1/2009 | Roddy et al. | |
| 7,607,482 B2 | 10/2009 | Roddy et al. | |
| 7,607,484 B2 | 10/2009 | Roddy et al. | |
| 7,627,870 B1 | 12/2009 | Michaeli et al. | |
| 7,631,692 B2 | 12/2009 | Roddy et al. | |
| 7,674,332 B2 | 3/2010 | Roddy et al. | |
| 7,708,071 B2 | 5/2010 | Roddy et al. | |
| 7,743,828 B2 | 6/2010 | Roddy et al. | |
| 7,784,542 B2 | 8/2010 | Roddy et al. | |
| 7,789,150 B2 | 9/2010 | Roddy et al. | |
| 7,867,954 B2 | 1/2011 | Warrender et al. | |
| 7,927,419 B2 | 4/2011 | Roddy | |
| 8,030,253 B2 | 10/2011 | Roddy et al. | |
| 8,039,253 B2 | 10/2011 | Asou | |
| 8,261,827 B2 | 9/2012 | Roddy | |
| 8,281,859 B2 | 10/2012 | Roddy | |
| 8,297,357 B2 | 10/2012 | Brenneis | |
| 8,307,899 B2 | 11/2012 | Brenneis | |
| 8,318,642 B2 | 11/2012 | Roddy | |
| 8,327,939 B2 | 12/2012 | Roddy | |
| 8,333,240 B2 | 12/2012 | Roddy | |
| 8,399,387 B2 | 3/2013 | Roddy | |
| 8,434,553 B2 | 5/2013 | Brenneis et al. | |
| 8,440,596 B2 | 5/2013 | Brenneis et al. | |
| 2002/0033121 A1 | 3/2002 | Marko | |
| 2002/0073897 A1 | 6/2002 | Trato | |
| 2002/0117090 A1 | 8/2002 | Ku | |
| 2003/0116065 A1 | 6/2003 | Griffith et al. | |
| 2003/0116887 A1 | 6/2003 | Scott | |
| 2003/0167970 A1 | 9/2003 | Polston | |
| 2004/0007162 A1 | 1/2004 | Morioka et al. | |
| 2004/0040475 A1 | 3/2004 | De La Roij et al. | |
| 2004/0079260 A1 | 4/2004 | Datta et al. | |
| 2004/0107877 A1 | 6/2004 | Getzlaf et al. | |
| 2004/0108113 A1 | 6/2004 | Luke et al. | |
| 2004/0112600 A1 | 6/2004 | Luke et al. | |
| 2004/0129181 A1 | 7/2004 | Lalande et al. | |
| 2004/0182577 A1* | 9/2004 | Chatterji et al. | 166/305.1 |
| 2004/0187740 A1 | 9/2004 | Timmons | |
| 2004/0188091 A1 | 9/2004 | Luke et al. | |
| 2004/0191439 A1 | 9/2004 | Bour et al. | |
| 2004/0211562 A1 | 10/2004 | Brothers et al. | |
| 2004/0211564 A1 | 10/2004 | Brothers et al. | |
| 2004/0244650 A1 | 12/2004 | Brothers | |
| 2004/0244977 A1 | 12/2004 | Luke et al. | |
| 2004/0256102 A1 | 12/2004 | Trato | |
| 2004/0262000 A1 | 12/2004 | Morgan et al. | |
| 2005/0000734 A1 | 1/2005 | Getzlaf et al. | |
| 2005/0034867 A1 | 2/2005 | Griffith et al. | |
| 2005/0056191 A1 | 3/2005 | Brothers et al. | |
| 2005/0061505 A1 | 3/2005 | Caveny et al. | |
| 2005/0072599 A1 | 4/2005 | Luke et al. | |
| 2005/0077045 A1 | 4/2005 | Chatterj et al. | |
| 2005/0084334 A1 | 4/2005 | Shi et al. | |
| 2005/0098317 A1 | 5/2005 | Reddy et al. | |
| 2005/0133221 A1 | 6/2005 | Chatterji et al. | |
| 2006/0025312 A1 | 2/2006 | Santra et al. | |
| 2006/0054319 A1 | 3/2006 | Fyten | |
| 2006/0065399 A1 | 3/2006 | Luke et al. | |
| 2006/0081372 A1 | 4/2006 | Dealy et al. | |
| 2006/0166834 A1 | 7/2006 | Roddy | |
| 2006/0175060 A1 | 8/2006 | Reddy | |
| 2006/0260512 A1 | 11/2006 | Nordmeyer | |
| 2007/0056475 A1 | 3/2007 | Roddy et al. | |
| 2007/0056479 A1 | 3/2007 | Gray | |
| 2007/0089643 A1 | 4/2007 | Roddy et al. | |
| 2007/0102157 A1 | 5/2007 | Roddy et al. | |
| 2007/0137528 A1 | 6/2007 | LeRoy-Delage et al. | |
| 2007/0186820 A1 | 8/2007 | O'Hearn | |
| 2007/0289744 A1 | 12/2007 | Bingamon | |
| 2008/0092780 A1 | 4/2008 | Bingamon et al. | |
| 2008/0156491 A1 | 7/2008 | Roddy et al. | |
| 2008/0229979 A1 | 9/2008 | Lewis | |
| 2008/0300149 A1* | 12/2008 | Reddy et al. | 507/110 |
| 2009/0044726 A1 | 2/2009 | Brouillette et al. | |
| 2009/0120644 A1 | 5/2009 | Roddy et al. | |
| 2009/0124522 A1 | 5/2009 | Roddy et al. | |
| 2009/0200029 A1 | 8/2009 | Roddy et al. | |
| 2009/0266543 A1 | 10/2009 | Reddy et al. | |
| 2009/0312445 A1 | 12/2009 | Roddy et al. | |
| 2009/0320720 A1 | 12/2009 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0044057 A1 | 2/2010 | Dealy et al. | |
| 2010/0081584 A1 | 4/2010 | Perez | |
| 2010/0122816 A1 | 5/2010 | Lewis | |
| 2010/0258312 A1 | 10/2010 | Brenneis et al. | |
| 2010/0273912 A1 | 10/2010 | Roddy et al. | |
| 2010/0282466 A1 | 11/2010 | Brenneis et al. | |
| 2010/0292365 A1 | 11/2010 | Roddy et al. | |
| 2010/0294496 A1 | 11/2010 | Woytowich et al. | |
| 2011/0000400 A1 | 1/2011 | Roddy | |
| 2011/0017452 A1* | 1/2011 | Benkley et al. | 166/292 |
| 2011/0100626 A1 | 5/2011 | Brenneis | |
| 2011/0297378 A1* | 12/2011 | Reddy et al. | 166/293 |
| 2012/0145393 A1 | 6/2012 | Roddy | |
| 2012/0152539 A1 | 6/2012 | Karcher | |
| 2012/0193097 A1 | 8/2012 | Roddy | |
| 2012/0227631 A1 | 9/2012 | Roddy | |
| 2012/0234541 A1 | 9/2012 | Roddy | |
| 2012/0267107 A1 | 10/2012 | Benkley et al. | |
| 2012/0285682 A1* | 11/2012 | Santra et al. | 166/293 |
| 2012/0291674 A1 | 11/2012 | Brenneis et al. | |
| 2012/0318506 A1 | 12/2012 | Benkley et al. | |
| 2012/0325119 A1 | 12/2012 | Brenneis et al. | |
| 2012/0325476 A1 | 12/2012 | Brenneis et al. | |
| 2012/0325477 A1 | 12/2012 | Brenneis et al. | |
| 2012/0328377 A1 | 12/2012 | Brenneis et al. | |
| 2013/0008352 A1 | 1/2013 | Roddy et al. | |

| | | | |
|---|---|---|---|
| 2013/0048286 | A1 | 2/2013 | Morgan et al. |
| 2013/0061779 | A1 | 3/2013 | Brenneis |
| 2013/0112405 | A1 | 5/2013 | Chatterji et al. |

FOREIGN PATENT DOCUMENTS

| | | |
|---|---|---|
| CA | 2153372 | 1/2006 |
| CN | 1054620 C | 11/1997 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| EP | 1900703 | 3/2008 |
| EP | 2075303 | 7/2009 |
| GB | 1469954 | 4/1997 |
| GB | 2455446 | 6/2009 |
| JP | 52117316 | 10/1977 |
| JP | 10110487 | 4/1998 |
| RU | 2026959 | 1/1995 |
| RU | 2003136028 | 5/2005 |
| SU | 1373781 | 2/1988 |
| WO | WO 83/01443 | 9/1982 |
| WO | 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | 2007/041841 | 4/2007 |
| WO | WO 2007/048999 | 5/2007 |
| WO | WO 2007/128945 | 11/2007 |
| WO | WO 2009/138747 | 11/2009 |

OTHER PUBLICATIONS

International Search Report for PCT/GB2011/001749 dated Apr. 5, 2012.
International Search Report and Written Opinion for PCT/GB2010/000712 dated Jul. 26, 2010.
Office Action for U.S. Appl. No. 13/620,013 dated Feb. 26, 2013.
U.S. Appl. No. 13/477,777, filed May 22, 2012, Roddy.
U.S. Appl. No. 13/479,476, filed May 24, 2012, Roddy.
U.S. Appl. No. 13/560,406, filed Jul. 27, 2012, Brenneis et al.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement and Pozmix 140."
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
Lafarge brochure "TerraCem™", Aug. 2006.
Lafarge MSDS "Cement Kiln Dust", Mar. 3, 2005.
Lafarge MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-973, 2005.
Answer 13 of 24 Chemical Abstracts on STN "Manufacture of ceramic particles from floatstone and fly ash", CN 1182062 (abstract only).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.

Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
English language translation of Foreign Office Action for Application No. RU2008113765, Jul. 6, 2009.
Foreign Office Action for Canadian Patent Application No. 2621835, Oct. 2, 2009.
Foreign Office Action for Canadian Patent Application No. 2621832, Oct. 5, 2009.
PCT International Search Report and Written Opinion for International Application No. PCT/GB2009/002598, Feb. 11, 2010.
PCT International Search Report and Written Opinion for International Application No. PCT/GB2009/002597, Feb. 1, 2010.
English language translation of USSR Patent No. RU 2026959, Jan. 20, 1995.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from USPTO U.S. Appl. No. 12/609,993, Jul. 26, 2010.
Foreign Office Action for EP Application No. 06 779 194.7, Jul. 2, 2010.
Office Action from U.S. Appl. No. 12/588,097, Sep. 3, 2010.
Foreign Office Action for EP Application No. 06 779 199.6, Mar. 1, 2010.
Office Action from U.S. Appl. No. 12/844,612, Oct. 1, 2010.
Foreign Office Action for EP Application No. 06 779 191.3, Mar. 31, 2010.
Foreign Office Action for CN Application No. 200680042004.X, May 12, 2010.
Foreign Office Action for RU Application No. 2008113766, Jul. 14, 2009.
Foreign Office Action for RU Application No. 2008113766, Apr. 8, 2010.
Foreign Office Action for EP Application No. 06 794 646.7, Sep. 24, 2010.
Office Action from U.S. Appl. No. 12/833,189, Oct. 1, 2010.
HES Brochure "Tuned® Spacer V", Aug. 2010.
HES Brochure "Tuned Spacer™ III", Apr. 2007.
HES Brochure "Enhancer 923™ Cement Agent".
HES Brochure "Enhancer 923™ Agent—Successes from the Field", Jun. 2010.
Suyan, "An Innovative Material for Severe Lost Circulation Control in Depleted Formations" SPE/IADC 125693, Oct. 2009.
HES Brochure "Thermatek® RSP Rapid Set Plug Service", Mar. 2008.
HES Brochure "Thermatek Service", May 2005.
Vinson, "Acid Removable Cement System Helps Lost Circulation in Productive Zones", IADC/SPE 23929, Feb. 1992.
Foreign Office Action for Canadian Application No. 2650630, Oct. 14, 2010.
Foreign Office Action for EP Application No. 09 713 469.6, Sep. 28, 2010.
PCT International Search Report and Written Opinion for International Application No. PCT/GB2009/000295, Jul. 30, 2009.
PCT International Preliminary Report on Patentability for International Application No. PCT/GB2009/000295, Aug. 24, 2010.
English language translation of Foreign Office Action for Chinese Application No. 200680042014.3, Dec. 1, 2010.
Office Action from U.S. Appl. No. 12/844,612, Jan. 28, 2011.
Foreign Office Action for Canadian Application No. 2658155, Nov. 16, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Preliminary Report on Patentability for International Application No. PCT/GB2009/002018, Mar. 24, 2011.
PCT International Search Report and Written Opinion for International Application No. PCT/GB2011/000933, Sep. 22, 2011.
Office Action from U.S. Appl. No. 12/844,612, Sep. 6, 2011.
Notice of Allowability for U.S. Appl. No. 12/544,915, Aug. 1, 2011.
PCT International Search Report and Written Opinion for International Application No. PCT/GB2011/001411, Jan. 27, 2012.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Adaska and Taubert, "Beneficial Uses of Cement Kiln Dust", 2008 IEEE/PCA 50th Cement Industry Technical Conference, Miami, FL, pp. 1-19, May 19, 2008.
Office Action from U.S. Appl. No. 12/825,004, Jun. 14, 2012.
Office Action from U.S. Appl. No. 13/447,560, Jun. 21, 2012.
Office Action from U.S. Appl. No. 13/479,476, Jul. 2, 2012.
Office Action from U.S. Appl. No. 12/975,196, Jul. 3, 2012.
Office Action from U.S. Appl. No. 12/844,612, Jul. 30, 2012.
HES Brochure "Tuned® Spacer IV", Dec. 2010.
HES Brochure "SA-1015™ Suspending Agent", Mar. 2012.
HES Brochure "Foamer 760™ Foamer/Stabilizer", Aug. 2010.
HES Brochure "Econolite™ Additive", Aug. 2007.
Notice of Allowance from U.S. Appl. No. 13/399,913 dated Aug. 23, 2012.
Notice of Allowance from U.S. Appl. No. 13/535,258 dated Sep. 7, 2012.
Notice of Allowance from U.S. Appl. No. 12/825,004 dated Sep. 20, 2012.
Office Action from U.S. Appl. No. 13/477,777 dated Oct. 15, 2012.
Notice of Allowance from U.S. Appl. No. 12/844,612 dated Oct. 18, 2012.
Final Office Action from U.S. Appl. No. 12/975,196 dated Oct. 23, 2012.
Office Action from U.S. Appl. No. 13/555,624 dated Oct. 19, 2012.
U.S. Appl. No. 13/622,821, filed Sep. 19, 2012.
U.S. Appl. No. 13/620,163, filed Sep. 14, 2012.
U.S. Appl. No. 13/620,013, filed Sep. 14, 2012.
U.S. Appl. No. 13/662,111, filed Oct. 26, 2012.
U.S. Appl. No. 13/669,149, filed Nov. 5, 2012.
USPTO Office Action for U.S. Appl. No. 13/431,701 dated Nov. 9, 2012.
USPTO Office Action for U.S. Appl. No. 13/620,163 dated Nov. 9, 2012.
International Search Report and Written Opinion for International Application No. PCT/US2012/046117 dated Oct. 26, 2012.
USPTO Office Action for U.S. Appl. No. 13/669,149 dated Dec. 19, 2012.
USPTO Office Action for U.S. Appl. No. 13/606,098 dated Dec. 13, 2012.

U.S. Appl. No. 13/595,493, filed Aug. 27, 2012, James Robert Benkley.
U.S. Appl. No. 13/598,052, filed Aug. 29, 2012, D. Chad Brenneis.
U.S. Appl. No. 13/605,875, filed Sep. 6, 2012, D. Chad Brenneis.
U.S. Appl. No. 13/606,098, filed Sep. 7, 2012, Chad Brenneis.
U.S. Appl. No. 13/606,120, filed Sep. 7, 2012, Chad Brenneis.
U.S. Appl. No. 13/447,560, filed Apr. 16, 2012, Craig W. Roddy.
U.S. Appl. No. 13/180,238, filed Jul. 11, 2011, Jeffrey Karcher.
U.S. Appl. No. 13/399,913, filed Feb. 17, 2012, Craig W. Roddy.
Foreign Office Action for Canadian Application No. 2736148 dated May 29, 2012.
U.S. Appl. No. 13/767,710 (Benkley et al.) filed Feb. 14, 2013.
U.S. Appl. No. 13/851,391 (Chatterji et al.) filed Mar. 27, 2013.
U.S. Appl. No. 13/851,475 (Chatterji et al.) filed Mar. 27, 2013.
U.S. Appl. No. 13/851,925 (Chatterji et al.), filed Mar. 27, 2013.
U.S. Appl. No. 13/725,833 (Chatterji et al) filed Dec. 21, 2012.
Office Action for U.S. Appl. No. 13/725,833 (Chatterji et al.) mailing date: Apr. 10, 2013.
U.S. Appl. No. 13/872,063 (Chatterji at al.) filed Apr. 23, 2013.
U.S. Appl. No. 13/889,398 (Benkley et al.) filed May 8, 2013.
U.S. Appl. No. 13/872,063 (Chatterji et al.) filed Apr. 26, 2013.
Notice of Allowance, U.S. Appl. No. 13/669,149 (Brenneis et al.) mailed May 13, 2013.

* cited by examiner

FOAMED SPACER FLUIDS CONTAINING CEMENT KILN DUST AND METHODS OF USE

CROSS-REFERENCE TO RELATED APPLICATIONS

This application is a continuation-in-part of U.S. application Ser. No. 12/895,436, entitled "Spacer Fluids Containing Cement Kiln Dust and Methods of Use," filed on Sep. 30, 2010, which is a continuation-in-part of U.S. application Ser. No. 12/264,010, entitled "Reduced Carbon Footprint Sealing Compositions for Use in Subterranean Formations," filed on Nov. 3, 2008, which is a continuation-in-part of U.S. application Ser. No. 11/223,669, now U.S. Pat. No. 7,445,669, entitled "Settable Compositions Comprising Cement Kiln Dust and Additive(s)," filed Sep. 9, 2005, the entire disclosures of which are incorporated herein by reference.

BACKGROUND

The present invention relates to spacer fluids for use in subterranean operations and, more particularly, in certain embodiments, to foamed spacer fluids comprising cement kiln dust ("CKD") and methods of use in subterranean formations.

Spacer fluids are often used in subterranean operations to facilitate improved displacement efficiency when introducing new fluids into a well bore. For example, a spacer fluid can be used to displace a fluid in a well bore before introduction of another fluid. When used for drilling fluid displacement, spacer fluids can enhance solids removal as well as separate the drilling fluid from a physically incompatible fluid. For instance, in primary cementing operations, the spacer fluid may be placed into the well bore to separate the cement composition from the drilling fluid. Spacer fluids may also be placed between different drilling fluids during drilling change outs or between a drilling fluid and a completion brine, for example.

To be effective, the spacer fluid can have certain characteristics. For example, the spacer fluid may be compatible with the drilling fluid and the cement composition. This compatibility may also be present at downhole temperatures and pressures. In some instances, it is also desirable for the spacer fluid to leave surfaces in the well bore water wet, thus facilitating bonding with the cement composition. Rheology of the spacer fluid can also be important. A number of different rheological properties may be important in the design of a spacer fluid, including yield point, plastic viscosity, gel strength, and shear stress, among others. While rheology can be important in spacer fluid design, conventional spacer fluids may not have the desired rheology at downhole temperatures. For instance, conventional spacer fluids may experience undesired thermal thinning at elevated temperatures. As a result, conventional spacer fluids may not provide the desired displacement in some instances.

SUMMARY

The present invention relates to spacer fluids for use in subterranean operations and, more particularly, in certain embodiments, to foamed spacer fluids comprising CKD and methods of use in subterranean formations.

An embodiment discloses a method comprising: providing a foamed spacer fluid comprising CKD, a foaming agent, a gas, and water; and introducing the foamed spacer fluid into a well bore to displace at least a portion of a first fluid present in the well bore.

Another embodiment discloses a method comprising: providing a foamed spacer fluid comprising a partially calcined kiln feed removed from a gas stream, a foaming agent, a gas, and water, wherein the partially calcined kiln feed comprises $SiO_2$, $Al_2O_3$, $Fe_2O_3$, CaO, MgO, $SO_3$, $Na_2O$, and $K_2O$; and introducing the foamed spacer fluid into a well bore to displace at least a portion of a first fluid present in the well bore.

Yet another embodiment discloses a foamed spacer fluid comprising: CKD, a foaming agent, a gas, and water, wherein the foamed spacer fluid has: a higher yield point at 130° F. than at 80° F., a higher yield point at 180° F. than at 80° F., and/or a higher plastic viscosity at 180° F. than at 80° F.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to spacer fluids for use in subterranean operations and, more particularly, in certain embodiments, to foamed spacer fluids that comprise CKD and methods that use CKD for enhancing one or more rheological properties of a spacer fluid. There may be several potential advantages to the methods and compositions of the present invention, only some of which may be alluded to herein. One of the many potential advantages of the methods and compositions of the present invention is that the CKD may be used in spacer fluids as a rheology modifier allowing formulation of a spacer fluid with desirable rheological properties. Another potential advantage of the methods and compositions of the present invention is that inclusion of the CKD in the spacer fluids may result in a spacer fluid without undesired thermal thinning. Yet another potential advantage of the present invention is that spacer fluids comprising CKD may be more economical than conventional spacer fluids, which are commonly prepared with higher cost additives. Yet another potential advantage of the present invention is that foamed spacer fluids comprising CKD may be used for displacement of lightweight drilling fluids.

Embodiments of the spacer fluids of the present invention may comprise water and CKD. In some embodiments, the spacer fluids may be foamed. For example, the foamed spacer fluids may comprise water, CKD, a foaming agent, and a gas. A foamed spacer fluid may be used, for example, where it is desired for the spacer fluid to be lightweight. In accordance with present embodiments, the spacer fluid may be used to displace a first fluid from a well bore with the spacer fluid having a higher yield point than the first fluid. For example, the spacer fluid may be used to displace at least a portion of a drilling fluid from the well bore. Other optional additives may also be included in embodiments of the spacer fluids as desired for a particular application. For example, the spacer fluids may further comprise viscosifying agents, organic polymers, dispersants, surfactants, weighting agents, and any combination thereof.

The spacer fluids generally should have a density suitable for a particular application as desired by those of ordinary skill in the art, with the benefit of this disclosure. In some embodiments, the spacer fluids may have a density in the range of from about 4 pounds per gallon ("lb/gal") to about 24 lb/gal. In other embodiments, the spacer fluids may have a density in the range of about 4 lb/gal to about 17 lb/gal. In yet other embodiments, the spacer fluids may have a density in the range of about 8 lb/gal to about 13 lb/gal. Embodiments of the spacer fluids may be foamed or unfoamed or comprise other means to reduce their densities known in the art, such as lightweight additives. Those of ordinary skill in the art, with the benefit of this disclosure, will recognize the appropriate density for a particular application.

The water used in an embodiment of the spacer fluids may include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the spacer fluid. The water is included in an amount sufficient to form a pumpable spacer fluid. In some embodiments, the water may be included in the spacer fluids in an amount in the range of from about 15% to about 95% by weight of the spacer fluid. In other embodiments, the water may be included in the spacer fluids of the present invention in an amount in the range of from about 25% to about 85% by weight of the spacer fluid. One of ordinary skill in the art, with the benefit of this disclosure, will recognize the appropriate amount of water to include for a chosen application.

The CKD may be included in embodiments of the spacer fluids as a rheology modifier. Among other things, using CKD in embodiments of the present invention can provide spacer fluids having rheology suitable for a particular application. Desirable rheology may be advantageous to provide a spacer fluid that is effective for drilling fluid displacement, for example. In some instances, the CKD can be used to provide a spacer fluid with a low degree of thermal thinning. For example, the spacer fluid may even have a yield point that increases at elevated temperatures, such as those encountered downhole.

CKD is a material generated during the manufacture of cement that is commonly referred to as cement kiln dust. The term "CKD" is used herein to mean cement kiln dust as described herein and equivalent forms of cement kiln dust made in other ways. The term "CKD" typically refers to a partially calcined kiln feed which can be removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. Because the CKD is commonly disposed as a waste material, spacer fluids prepared with CKD may be more economical than conventional spacer fluids, which are commonly prepared with higher cost additives. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

The CKD may be included in the spacer fluids in an amount sufficient to provide, for example, the desired rheological properties. In some embodiments, the CKD may be present in the spacer fluids in an amount in the range of from about 1% to about 65% by weight of the spacer fluid (e.g., about 1%, about 5%, about 10%, about 15%, about 20%, about 25%, about 30%, about 35%, about 40%, about 45%, about 50%, about 55%, about 60%, about 65%, etc.). In some embodiments, the CKD may be present in the spacer fluids in an amount in the range of from about 5% to about 60% by weight of the spacer fluid. In some embodiments, the CKD may be present in an amount in the range of from about 20% to about 35% by weight of the spacer fluid. Alternatively, the amount of CKD may be expressed by weight of dry solids. As used herein, the term "by weight dry solids" refers to the amount of a component, such as CKD, relative to the overall amount of dry solids used in preparation of the spacer fluid. For example, the CKD may be present in an amount in a range of from about 1% to 100% by weight of dry solids (e.g., about 1%, about 5%, about 10%, about 20%, about 30%, about 40%, about 50%, about 60%, about 70%, about 80%, about 90%, 100%, etc.). In some embodiments, the CKD may be present in an amount in the range of from about 50% to 100% and, alternatively, from about 80% to 100% by weight of dry solids. One of ordinary skill in the art, with the benefit of this disclosure, will recognize the appropriate amount of CKD to include for a chosen application.

While the preceding description describes CKD, the present invention is broad enough to encompass the use of other partially calcined kiln feeds. For example, embodiments of the spacer fluids may comprise lime kiln dust, which is a material that is generated during the manufacture of lime. The term lime kiln dust typically refers to a partially calcined kiln feed which can be removed from the gas stream and collected, for example, in a dust collector during the manufacture of lime. The chemical analysis of lime kiln dust from various lime manufactures varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

Optionally, embodiments of the spacer fluids may further comprise fly ash. A variety of fly ashes may be suitable, including fly ash classified as Class C or Class F fly ash according to American Petroleum Institute, *API Specification for Materials and Testing for Well Cements*, API Specification 10, Fifth Ed., Jul. 1, 1990. Suitable examples of fly ash include, but are not limited to, POZMIX® A cement additive, commercially available from Halliburton Energy Services, Inc., Duncan, Okla. Where used, the fly ash generally may be included in the spacer fluids in an amount desired for a particular application. In some embodiments, the fly ash may be present in the spacer fluids in an amount in the range of from about 1% to about 60% by weight of the spacer fluid (e.g., about 5%, about 10%, about 15%, about 20%, about 25%, about 30%, about 35%, about 40%, about 45%, about 50%, about 55%, etc.). In some embodiments, the fly ash may be present in the spacer fluids in an amount in the range of from about 1% to about 35% by weight of the spacer fluid. In some embodiments, the fly ash may be present in the spacer fluids in an amount in the range of from about 1% to about 10% by weight of the spacer fluid. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some embodiments, the fly ash may be present in an amount in the range of from about 1% to about 20% and, alternatively, from about 1% to about 10% by weight of dry solids. One of ordinary skill in the art, with the benefit of this disclosure, will recognize the appropriate amount of the fly ash to include for a chosen application.

Optionally, embodiments of the spacer fluids may further comprise a free water control additive. As used herein, the term "free water control additive" refers to an additive included in a liquid for, among other things, reducing (or preventing) the presence of free water in the liquid. Free water control additive may also reduce (or prevent) the settling of solids. Examples of suitable free water control additives include, but are not limited to, bentonite, amorphous silica, hydroxyethyl cellulose, and combinations thereof. An example of a suitable free water control additive is SA-1015™ suspending agent, available from Halliburton Energy Services, Inc. Another example of a suitable free water control additive is WG-17™ solid additive, available from Halliburton Energy Services, Inc. The free water control additive may be provided as a dry solid in some embodiments. Where used, the free water control additive may be present in an amount in the range of from about 0.1% to about 16% by weight of dry solids, for example. In alternative embodiments, the free water control additive may be present in an amount in the range of from about 0.1% to about 2% by weight of dry solids.

In some embodiments, the spacer fluids may further comprise a lightweight additive. The lightweight additive may be included to reduce the density of embodiments of the spacer fluids. For example, the lightweight additive may be used to fours a lightweight spacer fluid, for example, having a density of less than about 13 lb/gal. The lightweight additive typically may have a specific gravity of less than about 2.0. Examples of suitable lightweight additives may include sodium silicate, hollow microspheres, gilsonite, perlite, and combinations thereof. An example of a suitable sodium silicate is ECONO-LITE™ additive, available from Halliburton Energy Services, Inc. Where used, the lightweight additive may be present in an amount in the range of from about 0.1% to about 20% by weight of dry solids, for example. In alternative embodiments, the lightweight additive may be present in an amount in the range of from about 1% to about 10% by weight of dry solids.

As previously mentioned, embodiments of the spacer fluids may be foamed with a gas, for example, to provide a spacer fluid with a reduced density. It should be understood that reduced densities may be needed for embodiments of the spacer fluids to more approximately match the density of a particular drilling fluid, for example, where lightweight drilling fluids are being used. A drilling fluid may be considered lightweight if it has a density of less than about 13 lb/gal, alternatively, less than about 10 lb/gal, and alternatively less than about 9 lb/gal. In some embodiments, the spacer fluids may be foamed to have a density within about 10% of the density of the drilling fluid and, alternatively, within about 5% of the density of the drilling fluid. While techniques, such as lightweight additives, may be used to reduce the density of the spacer fluids comprising CKD without foaming, these techniques may have drawbacks. For example, reduction of the spacer fluid's density to below about 13 lb/gal using lightweight additives may produce unstable slurries, which can have problems with settling of solids, floating of lightweight additives, and free water, among others. Accordingly, the spacer fluid may be foamed to provide a spacer fluid having a reduced density that is more stable.

Therefore, in some embodiments, the spacer fluids may be foamed and comprise water, CKD, a foaming agent, and a gas. Optionally, to provide a spacer fluid with a lower density and more stable foam, the foamed spacer fluid may further comprise a lightweight additive, for example. With the lightweight additive, a base slurry may be prepared that may then be foamed to provide an even lower density. In some embodiments, the foamed spacer fluid may have a density in the range of from about 4 lb/gal to about 13 lb/gal and, alternatively, about 7 lb/gal to about 9 lb/gal. In one particular embodiment, a base slurry may be foamed from a density of in the range of from about 9 lb/gal to about 13 lb/gal to a lower density, for example, in a range of from about 7 lb/gal to about 9 lb/gal.

The gas used in embodiments of the foamed spacer fluids may be any suitable gas for foaming the spacer fluid, including, but not limited to air, nitrogen, and combinations thereof. Generally, the gas should be present in embodiments of the foamed spacer fluids in an amount sufficient to form the desired foam. In certain embodiments, the gas may be present in an amount in the range of from about 5% to about 80% by volume of the foamed spacer fluid at atmospheric pressure, alternatively, about 5% to about 55% by volume, and, alternatively, about 15% to about 30% by volume.

Where foamed, embodiments of the spacer fluids may comprise a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the spacer fluids. Examples of suitable foaming agents may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming agent is FOAMER™ 760 foamer/stabilizer, available from Halliburton Energy Services, Inc. Suitable foaming agents are described in U.S. Pat. Nos. 6,797,054, 6,547,871, 6,367,550, 6,063,738, and 5,897,699, the entire disclosures of which are incorporated herein by reference.

Generally, the foaming agent may be present in embodiments of the foamed spacer fluids in an amount sufficient to provide a suitable foam. In some embodiments, the foaming agent may be present in an amount in the range of from about 0.8% to about 5% by volume of the water ("bvow").

A wide variety of additional additives may be included in the spacer fluids as deemed appropriate by one skilled in the art, with the benefit of this disclosure. Examples of such additives include, but are not limited to, weighting agents, viscosifying agents (e.g., clays, hydratable polymers, guar gum), fluid loss control additives, lost circulation materials, filtration control additives, dispersants, defoamers, corrosion inhibitors, scale inhibitors, formation conditioning agents. Specific examples of these, and other, additives include organic polymers, surfactants, crystalline silica, amorphous silica, fumed silica, salts, fibers, hydratable clays, microspheres, rice husk ash, combinations thereof, and the like. A person having ordinary skill in the art, with the benefit of this disclosure, will readily be able to determine the type and amount of additive useful for a particular application and desired result.

Embodiments of the spacer fluids of the present invention may be prepared in accordance with any suitable technique. In some embodiments, the desired quantity of water may be introduced into a mixer (e.g., a cement blender) followed by the dry blend. The dry blend may comprise the CKD and additional solid additives, for example. Additional liquid additives, if any, may be added to the water as desired prior to, or after, combination with the dry blend. This mixture may be agitated for a sufficient period of time to form a base slurry. This base slurry may then be introduced into the well bore via pumps, for example. In the foamed embodiments, the base slurry may be pumped into the well bore, and a foaming agent may be metered into the base slurry followed by injection of a gas, e.g., at a foam mixing "T," in an amount sufficient to foam the base slurry thereby forming a foamed spacer fluid, in accordance with embodiments of the present invention. After foaming, the foamed spacer fluid may be introduced into a well bore. As will be appreciated by those of ordinary skill in the art, with the benefit of this disclosure, other suitable techniques for preparing spacer fluids may be used in accordance with embodiments of the present invention.

An example method of the present invention includes a method of enhancing rheological properties of a spacer fluid. The method may comprise including CKD in a spacer fluid. The CKD may be included in the spacer fluid in an amount sufficient to provide a higher yield point than a first fluid. The higher yield point may be desirable, for example, to effectively displace the first fluid from the well bore. As used herein, the term "yield point" refers to the resistance of a fluid to initial flow, or representing the stress required to start fluid movement. In an embodiment, the yield point of the spacer fluid at a temperature of up to about 180° F. is greater than about 5 lb/100 ft$^2$. In an embodiment, the yield point of the spacer fluid at a temperature of up to about 180° F. is greater than about 10 lb/100 ft$^2$. In an embodiment, the yield point of the spacer fluid at a temperature of up to about 180° F. is greater than about 20 lb/100 ft$^2$. It may be desirable for the spacer fluid to not thermally thin to a yield point below the first fluid at elevated temperatures. Accordingly, the spacer fluid may have a higher yield point than the first fluid at elevated temperatures, such as 180° F. or bottom hole static temperature ("BHST"). In one embodiment, the spacer fluid may have a yield point that increases at elevated temperatures. For example, the spacer fluid may have a yield point that is higher at 180° F. than at 80° F. By way of further example. The spacer fluid may have a yield point that is higher at BHST than at 80° F.

Another example method of the present invention includes a method of displacing a first fluid from a well bore, the well bore penetrating a subterranean formation. The method may comprise providing a spacer fluid that comprises CKD and water. The method may further comprise introducing the spacer fluid into the well bore to displace at least a portion of the first fluid from the well bore. In some embodiments, the spacer fluid may be characterized by having a higher yield point than the first fluid at 80° F. In some embodiments, the spacer fluid may be characterized by having a higher yield point than the first fluid at 130° F. In some embodiments, the spacer fluid may be characterized by having a higher yield point than the first fluid at 180° F.

In an embodiment, the first fluid displaced by the spacer fluid comprises a drilling fluid. By way of example, the spacer fluid may be used to displace the drilling fluid from the well bore. The drilling fluid may include, for example, any number of fluids, such as solid suspensions, mixtures, and emulsions. Additional steps in embodiments of the method may comprise introducing a pipe string into the well bore, introducing a cement composition into the well bore with the spacer fluid separating the cement composition and the first fluid. In an embodiment, the cement composition may be allowed to set in the well bore. The cement composition may include, for example, cement and water.

Another example method of the present invention includes a method of separating fluids in a well bore, the well bore penetrating a subterranean formation. The method may comprise introducing a spacer fluid into the well bore, the well bore having a first fluid disposed therein. The spacer fluid may comprise, for example, CKD and water. The method may further comprise introducing a second fluid into the well bore with the spacer fluid separating the first fluid and the second fluid. In an embodiment, the first fluid comprises a drilling fluid and the second fluid comprises a cement composition. By way of example, the spacer fluid may prevent the cement composition from contacting the drilling fluid. In an embodiment, the cement composition comprises cement kiln dust, water, and optionally a hydraulic cementitious material. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, API Specification for Materials and Testing for Well Cements, API Specification 10, Fifth Ed., Jul. 1, 1990. The spacer fluid may also remove the drilling fluid, dehydrated/gelled drilling fluid, and/or filter cake solids from the well bore in advance of the cement composition. Removal of these compositions from the well bore may enhance bonding of the cement composition to surfaces in the well bore. In an additional embodiment, at least a portion of used and/or unused CKD containing spacer fluid are included in the cement composition that is placed into the well and allowed to set.

To facilitate a better understanding of the present invention, the following examples of certain aspects of some embodiments are given. In no way should the following examples be read to limit, or define, the scope of the invention. In the following examples, concentrations are given in weight percent of the overall composition.

EXAMPLE 1

Sample spacer fluids were prepared to evaluate the rheological properties of spacer fluids containing CKD. The sample spacer fluids were prepared as follows. First, all dry components (e.g., CKD, fly ash, bentonite, FWCA, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Spacer Fluid No. 1 was an 11 pound per gallon slurry that comprised 60.62% water, 34.17% CKD, 4.63% fly ash, and 0.58% free water control additive (WG-17™ solid additive).

Sample Spacer Fluid No. 2 was an 11 pound per gallon slurry that comprised 60.79% water, 30.42% CKD, 4.13% fly ash, 0.17% free water control additive (WG-17™ solid additive), 3.45% bentonite, and 1.04% Econolite™ additive.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 1

| Sample Fluid | Temp. (° F.) | Viscometer RPM | | | | | PV (cP) | YP (lb/100 ft²) |
|---|---|---|---|---|---|---|---|---|
| | | 300 | 200 | 100 | 6 | 3 | | |
| 1 | 80 | 145 | 127 | 90 | 24 | 14 | 113.3 | 27.4 |
| | 180 | 168 | 143 | 105 | 26 | 15 | 154.5 | 30.3 |
| 2 | 80 | 65 | 53 | 43 | 27 | 22 | 41.1 | 26.9 |
| | 180 | 70 | 61 | 55 | 22 | 18 | 51.6 | 25.8 |

The thickening time of the Sample Spacer Fluid No. 1 was also determined in accordance with API Recommended Practice 10B at 205° F. Sample Spacer Fluid No. 1 had a thickening time of more than 6:00+ hours at 35 Bc.

Accordingly, the above example illustrates that the addition of CKD to a spacer fluid may provide suitable properties for use in subterranean applications. In particular, the above example illustrates, inter alia, that CKD may be used to provide a spacer fluid that may not exhibit thermal thinning with the spacer fluid potentially even having a yield point that increases with temperature. For example, Sample Spacer Fluid No. 2 had a higher yield point at 180° F. than at 80° F. In addition, the yield point of Sample Spacer Fluid No. 1 had only a slight decrease at 180° F. as compared to 80° F. Even further, the example illustrates that addition of CKD to a spacer fluid may provide a plastic viscosity that increases with temperature.

EXAMPLE 2

Additional sample spacer fluids were prepared to further evaluate the rheological properties of spacer fluids containing CKD. The sample spacer fluids were prepared as follows. First, all dry components (e.g., CKD, fly ash) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Fluid No. 3 was a 12.5 pound per gallon fluid that comprised 47.29% water and 52.71% CKD.

Sample Fluid No. 4 was a 12.5 pound per gallon fluid that comprised 46.47% water, 40.15% CKD, and 13.38% fly ash.

Sample Fluid No. 5 was a 12.5 pound per gallon fluid that comprised 45.62% water, 27.19% CKD, and 27.19% fly ash.

Sample Fluid No. 6 was a 12.5 pound per gallon fluid that comprised 44.75% water, 13.81% CKD, and 41.44% fly ash.

Sample Fluid No. 7 (comparative) was a 12.5 pound per gallon fluid that comprised 43.85% water, and 56.15% fly ash.

Rheological values were then determined using a Fann Model 35 Viscometer. Dial readings were recorded at speeds of 3, 6, 30, 60, 100, 200, 300, and 600 with a B1 bob, an R1 rotor, and a 1.0 spring. The dial readings, plastic viscosity, and yield points for the spacer fluids were measured in accordance with API Recommended Practices 10B, Bingham plastic model and are set forth in the table below. The abbreviation "PV" refers to plastic viscosity, while the abbreviation "YP" refers to yield point.

TABLE 2

| Sample Spacer Fluid | CKD-Fly Ash Ratio | Temp. (° F.) | Viscometer RPM | | | | | | | | PV (cP) | YP (lb/100 ft²) |
|---|---|---|---|---|---|---|---|---|---|---|---|---|
| | | | 600 | 300 | 200 | 100 | 60 | 30 | 6 | 3 | | |
| 3 | 100:0 | 80 | 33 | 23 | 20 | 15 | 13 | 12 | 8 | 6 | 12 | 11 |
| | | 130 | 39 | 31 | 27 | 23 | 22 | 19 | 16 | 11 | 12 | 19 |
| | | 180 | 66 | 58 | 51 | 47 | 40 | 38 | 21 | 18 | 16.5 | 41.5 |
| 4 | 75:25 | 80 | 28 | 22 | 19 | 15 | 14 | 11 | 8 | 6 | 10.5 | 11.5 |
| | | 130 | 39 | 28 | 25 | 21 | 19 | 16 | 14 | 11 | 10.5 | 17.5 |
| | | 180 | 51 | 39 | 36 | 35 | 31 | 26 | 16 | 11 | 6 | 33 |
| 5 | 50:50 | 80 | 20 | 11 | 8 | 6 | 5 | 4 | 4 | 3 | 7.5 | 3.5 |
| | | 130 | 21 | 15 | 13 | 10 | 9 | 8 | 6 | 5 | 7.5 | 7.5 |
| | | 180 | 25 | 20 | 17 | 14 | 13 | 12 | 7 | 5 | 9 | 11 |
| 6 | 25:75 | 80 | 16 | 8 | 6 | 3 | 2 | 1 | 0 | 0 | 7.5 | 0.5 |
| | | 130 | 15 | 8 | 6 | 4 | 3 | 2 | 1 | 1 | 6 | 2 |
| | | 180 | 15 | 9 | 7 | 5 | 4 | 4 | 2 | 2 | 6 | 3 |
| 7 (Comp.) | 0:100 | 80 | 16 | 7 | 5 | 3 | 1 | 0 | 0 | 0 | 6 | 1 |
| | | 130 | 11 | 4 | 3 | 1 | 0 | 0 | 0 | 0 | 4.5 | −0.5 |
| | | 180 | 8 | 3 | 2 | 0 | 0 | 0 | 0 | 0 | 4.5 | −1.5 |

Accordingly, the above example illustrates that the addition of CKD to a spacer fluid may provide suitable properties for use in subterranean applications. In particular, the above example illustrates, inter alia, that CKD may be used to provide a spacer fluid that may not exhibit thermal thinning with the spacer fluid potentially even having a yield point that increases with temperature. In addition, as illustrated in Table 2 above, higher yield points were observed for spacer fluids with higher concentrations of CKD.

EXAMPLE 3

A sample spacer fluid containing CKD was prepared to compare the rheological properties of a spacer fluid containing CKD with an oil-based drilling fluid. The sample spacer fluid was prepared as follows. First, all dry components (e.g., CKD, fly ash, bentonite, etc.) were weighed into a glass container having a clean lid and agitated by hand until blended. Tap water was then weighed into a Waring blender jar. The dry components were then mixed into the water with 4,000 rpm stirring. The blender speed was then increased to 12,000 rpm for about 35 seconds.

Sample Spacer Fluid No. 8 was an 11 pound per gallon slurry that comprised 60.79% water, 30.42% CKD, 4.13% fly ash, 0.17% free water control additive (WG-17™ solid additive), 3.45% bentonite, and 1.04% Econolite™ additive.

The oil-based drilling fluid was a 9.1 pound per gallon oil-based mud.

Rheological values were then determined using a Fann Model 35 Viscometer. Dial readings were recorded at speeds of 3, 6, 100, 200, and 300 with a B1 bob, an R1 rotor, and a 1.0 spring. The dial readings, plastic viscosity, and yield points for the spacer fluid and drilling fluid were measured in accordance with API Recommended Practices 10B, Bingham plastic model and are set forth in the table below. The abbreviation "PV" refers to plastic viscosity, while the abbreviation "YP" refers to yield point. The abbreviation "OBM" refers to oil-based mud.

TABLE 3

| Sample | Temp. | Viscometer RPM | | | | | PV | YP |
|---|---|---|---|---|---|---|---|---|
| Fluid | (° F.) | 300 | 200 | 100 | 6 | 3 | (cP) | (lb/100 ft$^2$) |
| 8 | 80 | 59 | 50 | 39 | 22 | 15 | 42 | 21.2 |
|   | 180 | 82 | 54 | 48 | 16 | 13 | 65.3 | 17 |
| OBM | 80 | 83 | 64 | 41 | 11 | 10 | 74.6 | 12.1 |
|   | 180 | 46 | 35 | 23 | 10 | 10 | 36.7 | 10.5 |

Accordingly, the above example illustrates that the addition of CKD to a spacer fluid may provide suitable properties for use in subterranean applications. In particular, the above example illustrates, inter alia, that CKD may be used to provide a spacer fluid with a yield point that is greater than a drilling fluid even at elevated temperatures. For example, Sample Spacer Fluid No. 8 has a higher yield point at 180° F. than the oil-based mud.

EXAMPLE 4

A foamed spacer fluid was prepared that comprised CKD. First, a base slurry was prepared that had a density of 10 lb/gal and comprised CKD, a free water control additive (0.7% by weight of CKD), a lightweight additive (4% by weight of CKD), and fresh water (32.16 gallons per 94-pound sack of CKD). The free water control additive was SA-1015™ suspending aid. The lightweight additive was ECONOLITE™ additive. Next, a foaming agent (FOAMER™ 760 foamer/stabilizer) in an amount of 2% bvow was added, and the base slurry was then mixed in a foam blending jar for 4 seconds at 12,000 rpm. The resulting foamed spacer fluid had a density of 8.4 lb/gal. The "sink" of the resultant foamed spacer fluid was then measured using a free fluid test procedure as specified in API Recommended Practice 10B. However, rather than measuring the free fluid, the amount of "sink" was measured after the foamed spacer fluid remained static for a period of 2 hours. The foamed spacer fluid was initially at 200° and cooled to ambient temperature over the 2-hour period. The measured sink for this foamed spacer fluid was 5 millimeters.

EXAMPLE 5

Another foamed spacer fluid was prepared that comprised CKD. First, a base slurry was prepared that had a density of 10.5 lb/gal and comprised CKD, a free water control additive (0.6% by weight of CKD), a lightweight additive (4% by weight of CKD), and fresh water (23.7 gallons per 94-pound sack of CKD). The free water control additive was SA-1015™ suspending aid. The lightweight additive was ECONOLITE™ additive. Next, a foaming agent (a hexylene glycol/cocobetaine blended surfactant) in an amount of 2% bvow was added, and the base slurry was then mixed in a foam blending jar for 6 seconds at 12,000 rpm. The resulting foamed spacer fluid had a density of 8.304 lb/gal. The resultant foamed spacer fluid had a sink of 0 millimeters, measured as described above for Example 4.

Therefore, the present invention is well adapted to attain the ends and advantages mentioned as well as those that are inherent therein. Although individual embodiments are discussed, the invention covers all combinations of all those embodiments. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
   providing a foamed spacer fluid comprising cement kiln dust, a foaming agent, a gas, and water; and
   introducing the foamed spacer fluid into a well bore to displace at least a portion of a first fluid present in the well bore.

2. The method of claim 1 wherein the foamed spacer fluid has a yield point at 80° F. that is higher than a yield point of the first fluid at 80° F.

3. The method of claim 1 wherein the foamed spacer fluid has a yield point at 180° F. that is higher than a yield point of the first fluid at 180° F.

4. The method of claim 1 wherein the foamed spacer fluid has a higher yield point at bottom hole static temperature of the well bore than at 80° F.

5. The method of claim 1 wherein the yield point of the foamed spacer fluid at 180° F. is greater than about 20 lb/100 ft$^2$.

6. The method of claim 1 wherein the foamed spacer fluid has a density in a range of from about 4 lb/gal to about 13 lb/gal.

7. The method of claim 1 wherein providing the foamed spacer fluid comprises foaming a base slurry from a density in a range of from about 9 lb/gal to about 13 lb/gal to as density in a range of from about 7 lb/gal to about 9 lb/gal.

8. The method of claim 7, wherein foaming the base slurry comprises providing a base slurry comprising the cement kiln dust, a lightweight additive, a free water control additive, and the water; adding the gas to the base slurry; and adding the foaming agent to the base slurry.

9. The method of claim 1 wherein the cement kiln dust is present in the foamed spacer fluid in an amount in a range of from about 1% to about 60% by weight of the foamed spacer fluid.

10. The method of claim 1 wherein the cement kiln dust is present in the foamed spacer fluid in an amount in a range of from about 80% to 100% by weight of dry solids.

11. The method of claim 1 wherein the gas comprises at least one gas selected from the group consisting of air, nitrogen, and any combination thereof, and wherein the foaming agent comprises at least one additive selected from the group consisting of a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; a mixture of an ethoxylated alcohol ether sulfate surfactant, an alkyl or alkene amidopropy betaine surfactant, and an alkyl or alkene dimethylamine oxide surfactant; an aqueous solution of an alpha-olefinic sulfonate surfactant and a betaine surfactant; and any combination thereof.

12. The method of claim 1 wherein the foamed spacer fluid further comprises at least one additive selected from the group consisting of a free water control additive, a lightweight additive, a weighting agent, a viscosifying agent, a fluid loss control additive, a lost circulation material, a filtration control additive, a dispersant, a corrosion inhibitor, a scale inhibitor, a formation conditioning agent, and any combination thereof.

13. The method of claim 1 wherein the foamed spacer fluid further comprises at least one additive selected from the group consisting of fly ash, a clay, a hydratable polymer, guar gum, an organic polymer, a surfactant, crystalline silica, amorphous silica, fumed silica, a salt, a fiber, hydratable clay, a microsphere, rice husk ash, and any combination thereof.

14. The method of claim 1 wherein the first fluid comprises a drilling fluid.

15. The method of claim 14 further comprising introducing a cement composition into the well bore to displace at least a portion of the spacer fluid present in the well bore, wherein the spacer fluid separates the cement composition from the drilling fluid.

16. The method of claim 1 further comprising introducing a cement composition into the well bore to displace at least a portion of the spacer fluid present in the well bore, wherein the cement composition comprises cement kiln dust.

17. A method comprising:
providing a foamed spacer fluid comprising a partially calcined kiln feed removed from a gas stream, a foaming agent, a gas, and water, wherein the partially calcined kiln feed comprises $SiO_2$, $Al_2O_3$, $Fe_2O_3$, CaO, MgO, $SO_3$, $Na_2O$, and $K_2O$; and
introducing the foamed spacer fluid into a well bore to displace at least a portion of a first fluid present in the well bore.

18. The method of claim 17 wherein the foamed spacer fluid has as yield point at 80° F. that is higher than a yield point of the first fluid at 80° F.

19. The method of claim 17 wherein the foamed spacer fluid has a yield point at 180° F. that is higher than a yield point of the first fluid at 180° F.

20. The method of claim 17 wherein the foamed spacer fluid has a higher yield point at bottom hole static temperature of the well bore than at 80° F.

21. The method of claim 17 wherein the yield point of the foamed spacer fluid at 180° F. is greater than about 20 lb/100 ft$^2$.

22. The method of claim 17 wherein the foamed spacer fluid has a density in a range of from about 4 lb/gal to about 13 lb/gal.

23. The method of claim 17 wherein providing the foamed spacer fluid comprises foaming a base slurry from a density in a range of from about 9 lb/gal to about 13 lb/gal to a density in a range of from about 7 lb/gal to about 9 lb/gal.

24. The method of claim 23, wherein foaming the base slurry comprises providing a base slurry comprising the partially calcined kiln feed, a lightweight additive, a free water control additive, and the water; adding the gas to the base slurry; and adding the foaming agent to the base slurry.

25. The method of claim 17 wherein the partially calcined kiln feed is present in the foamed spacer fluid in an amount in a range of from about 1% to about 60% by weight of the foamed spacer fluid.

26. The method of claim 17 wherein the cement kiln dust is present in the foamed spacer fluid in an amount in a range of from about 80% to 100% by weight of dry solids.

27. The method of claim 17 wherein the partially calcined kiln feed is collected in a dust collector.

28. The method of claim 17 wherein the partially calcined kiln feed is from the manufacture of cement.

29. The method of claim 17 wherein the partially calcined kiln feed is from the manufacture of lime.

30. The method of claim 17 wherein the gas comprises least one gas selected from the group consisting of air, nitrogen, and any combination thereof, and wherein the foaming agent comprises at least one additive selected from the group consisting of a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide, surfactant, sodium chloride, and water; hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an alpha-olefinie sulfonate surfactant and a betaine surfactant; and any combination thereof.

31. The method of claim 17 wherein the foamed spacer fluid further comprises at least one additive selected from the group consisting of a free water control additive, a lightweight additive, a weighting agent, a viscosifying agent, a fluid loss control additive, a lost circulation material, a filtration control additive, a dispersant, a corrosion inhibitor, a scale inhibitor, a formation conditioning agent, and any combination thereof.

32. The method of claim 17 wherein the foamed spacer fluid further comprises at least one additive selected from the group consisting of fly ash, a clay, a hydratable polymer, guar gum, an organic polymer, a surfactant, crystalline silica, amorphous silica, fumed silica, a salt, a fiber, hydratable clay, a microsphere, rice husk ash, and any combination thereof.

33. The method of claim 17 wherein the first fluid comprises a drilling fluid.

34. The method of claim 33 further comprising introducing a cement composition into the well bore to displace at least a portion of the spacer fluid present in the well bore, wherein the spacer fluid separates the cement composition from the drilling fluid.

35. The method of claim 17 further comprising introducing a cement composition into the well bore to displace at least a portion of the spacer fluid present in the well bore, wherein the cement composition comprises cement kiln dust.

* * * * *